United States Patent [19]

Jalili et al.

[11] Patent Number: 5,423,042
[45] Date of Patent: Jun. 6, 1995

[54] REMOTE PROCEDURE EXECUTION

[75] Inventors: Reza Jalili, Mount Kisco, N.Y.; Wayne L. Wooten, Clarkston, Ga.

[73] Assignee: International Business Machines Corporation, Armonk, N.Y.

[21] Appl. No.: 965,656

[22] Filed: Oct. 23, 1992

[51] Int. Cl.⁶ .............................................. G06F 9/06
[52] U.S. Cl. ............................ 395/700; 364/DIG. 1; 364/284.4
[58] Field of Search ................................ 395/650, 700

[56] References Cited

U.S. PATENT DOCUMENTS

| 4,558,413 | 12/1985 | Schmidt et al. | 364/DIG. 1 |
| 4,782,517 | 11/1988 | Bernardis et al. | |
| 4,924,384 | 5/1990 | Hao et al. | |
| 5,057,996 | 10/1991 | Cutler et al. | 395/650 |

OTHER PUBLICATIONS

R. E. Kuseski, "PC Input Data Collection System", IBM Technical Disclosure Bulletin, vol. 32, No. 3A, Aug. 1989, pp. 212-217.
G. Barua et al., "DC: A Distributed Programming Language", Computer Science and Informatics, vol. 20, No. 2, pp. 1-13, Dec. 1990, India, Abstract.
Z. Sun et al., "Developing a Heterogeneous Distributed Operating System", Operating Systems Review, vol. 22, No. 2, pp. 24-31, Apr. 1988, USA, Abstract.

*Primary Examiner*—Thomas M. Heckler
*Attorney, Agent, or Firm*—Louis J. Percello

[57] ABSTRACT

A computer server program is disclosed that can execute object code provided by one or more clients even though the server was not previously programmed to execute specific code. The server executes the client code without re-compiling or re-linking. Clients provide the server with executable object code along with information about the code that allows the server to register the code object. By manipulating the registration information stored on the server, the clients can make various requests of the server which affect the execution of the code. Using the registration and request functions of the server, clients direct the server when, if, and how often to run object code or parts of object code called functions.

31 Claims, 5 Drawing Sheets

| FUNC-NAME 282 | TYPE-NAME 284 | INSTANCE 286 | STATE 288 | RESULTS 289 | ACTIVE 290 | REPEAT-COUNT 292 | PRIORITY 294 | FUNC-PTR 295 |
|---|---|---|---|---|---|---|---|---|
| MAKE WINDOW | GRAPHICS | 1 | | 502, 508 | 1→0 | 1 ←502 | 1 | |
| CLEAR WINDOW | GRAPHICS | 1 | | | 1 ←504 | 0 ←504 | 2 | |
| MAKE HAND | HAND | 1 | | 502, 510 | 1→0 | 1 ←502 | 30 | |
| MAKE HAND | HAND | 2 | | | 1 ←506 | 1 ←506 | 30 | |
| DRAW HAND | HAND | 1 | | 504, 512 | 1→0 | 1 ←504 | 40 | |
| DRAW HAND | HAND | 2 | | | 1 ←506 | 0 ←506 | 40 | |
| TRANSFER TO SCREEN | GRAPHICS | 1 | | | 1 ←504 | 0 ←504 | 999 | |

FIG. 5

REMOTE PROCEDURE EXECUTION

FIELD OF THE INVENTION

This invention relates to computer programs called servers. More specifically, the invention relates to servers which can execute, without re-compiling or re-linking, object code that the server was previously not designed to execute.

BACKGROUND OF THE INVENTION

A server is a computer program that provides a particular service to another computer program. A client is a computer program that uses the services of a server. Normally, a server program runs idle in a continuous loop awaiting requests from a client. At any time in this program loop, the server can be interrupted by a client request to perform a particular function.

Clients typically ask the server to perform tasks which the client cannot do. For example, a print server resides on a machine with a printer attachment and accepts requests from clients to print files on a printer. When the client wants to print a file, it sends the file to the server along with a request to print the file. The client may be a separate program running along with the server on a single computer or it may be a program running on an external computer which is somehow connected to the server computer.

Generally a server can accept requests to perform preprogrammed functions. That is, the server has a limited set of functions which are made available to a client through a language. The language can be as simple as a single command or as complex as a programming language. A client must communicate with a server in the language of the server. If the server understands the client's request, it satisfies the request by executing an appropriate portion of its own program. When a request, such as "Print" is received, a pre-determined previously linked function in the server is executed. Let's call this portion of the server's program an object.

An object must be written in a form which the computer can read or understand called object language. This object language is created from a programming language understood by humans by an apparatus called a compiler. In the prior art, before the server can perform a new function, a new object must be created or compiled from a programming language and combined with the server program, which itself has been compiled, through a process called linking. After all the portions of the server have been compiled and linked together, the server is ready for execution.

Other methods in the prior art use an interpreter in the server to interpret the client request. A client request in such a case is a program in a language which the server understands. The server interprets the client request by calling in sequence and, as specified by the client request, a set of predetermined functions. Using this method, a client can make a more complex request than by using the method above. However, this method has the disadvantages of limiting the client request to a set of functions or capabilities programmed into the server. The Adobe PostScript printer server is an example. (PostScript is a trademark of the Adobe computer company.) The server is given a client request in the form of a program called a PostScript file. The PostScript file contains commands along with non-command text. The command text is interpreted by the server in order to control the formatting and printing of the non-command text.

STATEMENT OF PROBLEMS WITH THE PRIOR ART

Servers in the prior art are written for specific applications. They execute only the functions for which they were originally programmed. They are not flexible enough to easily execute objects or applications that are different from their original program. In order to execute objects which fall outside of the server design, prior art servers have to be rewritten and recompiled. Prior art known to the inventors does not disclose servers which can execute an object code function, not designed into the server, without rewriting and recompiling the server.

The prior art does not teach about a single server executing unprogrammed functions. The prior art also does not teach about a single server which can execute a set of objects which can be modified.

The prior art, in cases where the server accepts and interprets a program from a client, require overhead associated with the interpreter which slows down the server. Interpreters are also limited to predefined functions which must be precompiled and prelinked to the server.

OBJECTS OF THE INVENTION

An object of this invention is to provide a design for a computer server program which can execute object code, which the server was not originally designed to execute, without recompiling the server program.

An object of this invention is to provide a design for a computer server program which can execute object code modified to perform different functions without recompiling the server program.

Another object of this invention is to provide a computer server program which can execute, with no recompilation, a plurality of different objects, each object containing functions being different from the functions designed to be performed by the server and each function execution requested by a separate client.

Another object of this invention is to provide a computer graphics server program which can execute, without recompiling, a plurality of different and modifiable objects from a plurality of clients so that each executed object controls a portion of a single graphics display.

SUMMARY OF THE INVENTION

The present invention discloses a computer server program which has the capability to execute a variety of different object programs, called functions, even though the server is not specifically designed to execute these object programs. The server can rerun these object programs if they are modified without recompiling. Also, one or more clients can add or delete objects or functions. The server executes these objects, and their functions, without having to be reprogrammed or recompiled. As a result, the present server can execute many different and modifiable objects much more quickly than prior art servers.

In the present invention, a client program loads an object program written in executable code into the server while the server is looping upon itself. The effect is that the server with the newly loaded object (executable object code) adds the function of the new object code to its own server program. (A function is a task performed by an object. Objects contain one or more functions.) In essence, the server with the added object code "remembers" how to perform the function(s) of the added object code and can perform the new object function(s) on demand without the need for the client to reload the object code again. Therefore, by adding more and more objects to the server, the server "learns" or gains each of the functions which are added to it by the objects. On the other hand, clients can request that the server "forget" or drop the functions previously added to it.

A client sends to the server objects which contain function(s) and other object information for the server to "learn." The server "learns" a function by registering the function, i.e., the server stores the object's functions and information about the object/functions in the server memory. Specifically, the server identifies the functions made available by this object, records those functions, and information about those functions in tables for future reference. During registration, the object code and other information is loaded in the server memory. The clients can make various requests of the server to modify the registration information and to cause the server to perform certain operations.

Once an object along with its function(s) has been registered with a server, a client can have the server run (i.e. execute) that object's function(s). The client does this by passing the server information about how the functions(s) is (are) to be run and requesting the server to call (i.e. execute) the function(s). At this point, the server will go through an execution procedure which runs the function(s) and possibly passes the results of running the function(s) to the client.

DETAILED DESCRIPTION OF THE INVENTION

The ability of the server to learn and forget objects, at the requests of different clients, makes the server very flexible, i.e. extends the number of functions that the server can perform. The server increases the flexibility of object program execution because the server does not need to be reprogrammed and recompiled before executing each new function. Furthermore, object functions that have already been "learned" by the server do not even have to be reloaded into the server. Therefore, the present invention, describes a server which is reprogramable and can execute new object functions "on the fly" or during its normal course of looping without the need to stop for recompiling. This capability, also called dynamic linking, allows the present server to be used in a number of applications which require this flexibility and speed of execution. These server applications, until now, had to operate at a slower pace or were not possible. Some of these applications include multi-media client-server applications, device drivers, resource servers, multi-user computer aid to design, and distributed computing applications.

Figure 1:
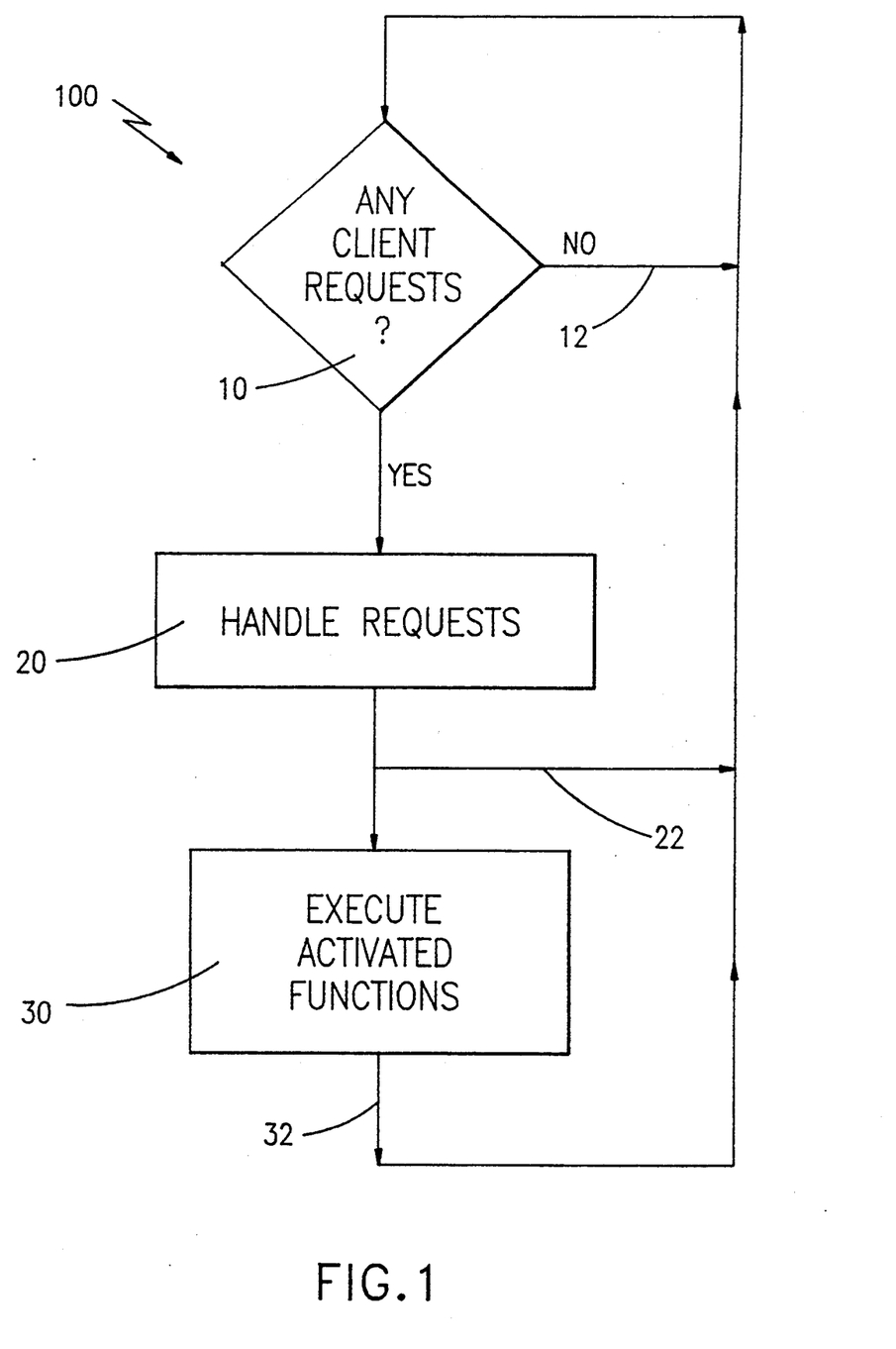
FIG. 1 is a flow chart of the server of the present invention.

FIG. 1 shows the server of the present invention. The server 100 is a computer program which runs in a continuous loop, looping in any way typically practiced in the prior art. In the preferred embodiment, the server runs on an IBM RISC System/6000 which is described in the IBM "Research Report RC 16553 1991 The IBM RISC System/6000: Architecture and Performance". (RISC System/6000 is a trademark of the IBM corporation.) The AIX 3.1 operating system is used. As in the prior art, at least one time in its loop, this server checks 10 to see if any client has made a request of the server. If no request is made 12, the server continues looping. However, if a client makes a request, the present server performs one of two novel operations. The first, box 20, is handling a client request like the registration of an object. The second, box 30, is the execution of registered object functions if the functions are activated., i.e., scheduled for execution in a way described below.

Examples of handling requests (box 20) include the following activities: REGISTER an object, UNREGISTER an object, ACTIVATE a function, DEACTIVATE a function, CALL a function of an object, SET FUNCTION DATA, GET FUNCTION DATA, and SET PRIORITY of a function. Other requests will be apparent to one skilled in the art given this disclosure and are within the contemplation of the invention. These activities will be described below.

When the server 100 has completed handling a request 20 and if there are no activated functions, the server continues to loop 22. However, if there are activated functions, the server executes them, box 30, and then continues to loop 32.

A client is a computer program which requires the server to run some code for the client. The client can run on the same computer as the server or can run on a computer external to but communicating with the server computer. Clients using the present server can provide multiple objects to the server for the server to run. The server can service multiple clients.

The user designing the client insures that each object is written in executable form. That is, all functions of the object are written in object code and are linked together so that they will run on the server computer when loaded.

These objects, to be run by the server, should have certain characteristics. To prevent duplicate registration of object functions, the user insures that the name of the object type (Type_Name) is known and used by all other clients that would request the server to run the object. (Note that objects of the same type, i.e., having the same type_name, contain identical functions.) Furthermore, functions which are shared among common object types must have no internal state. (For example, a counter which can be changed by multiple clients must be managed in a way to maintain coherence. To achieve this, the clients can have knowledge of type_names designed into their client memory or this information can be exchanged among clients by using known communication techniques.) In addition, the user insures that the client will not request that the server execute an object that runs in an infinite loop unless the client wants to change the characteristics of the server to those of the object running in the infinite loop.

An object is a computer program reduced to executable code, i.e., object language internally linked so that it will run when loaded on the server. A client registers an object (i.e., the functions contained in the object) with the server using a REGISTER request. After object/function registration, the client may request the server to run the object functions. The object includes a set of one or more functions that can be run.

The novel concept of registration, one of the activities included in the handling of requests in box 20, is now explained.

One function which exists on every object in the present invention is called an entry function. The entry function has a memory structure which includes fields that are found in a function table (described below). It also has one argument (i.e., information that the entry function uses, here called init_table_pointer or ITP).

Figure 2:
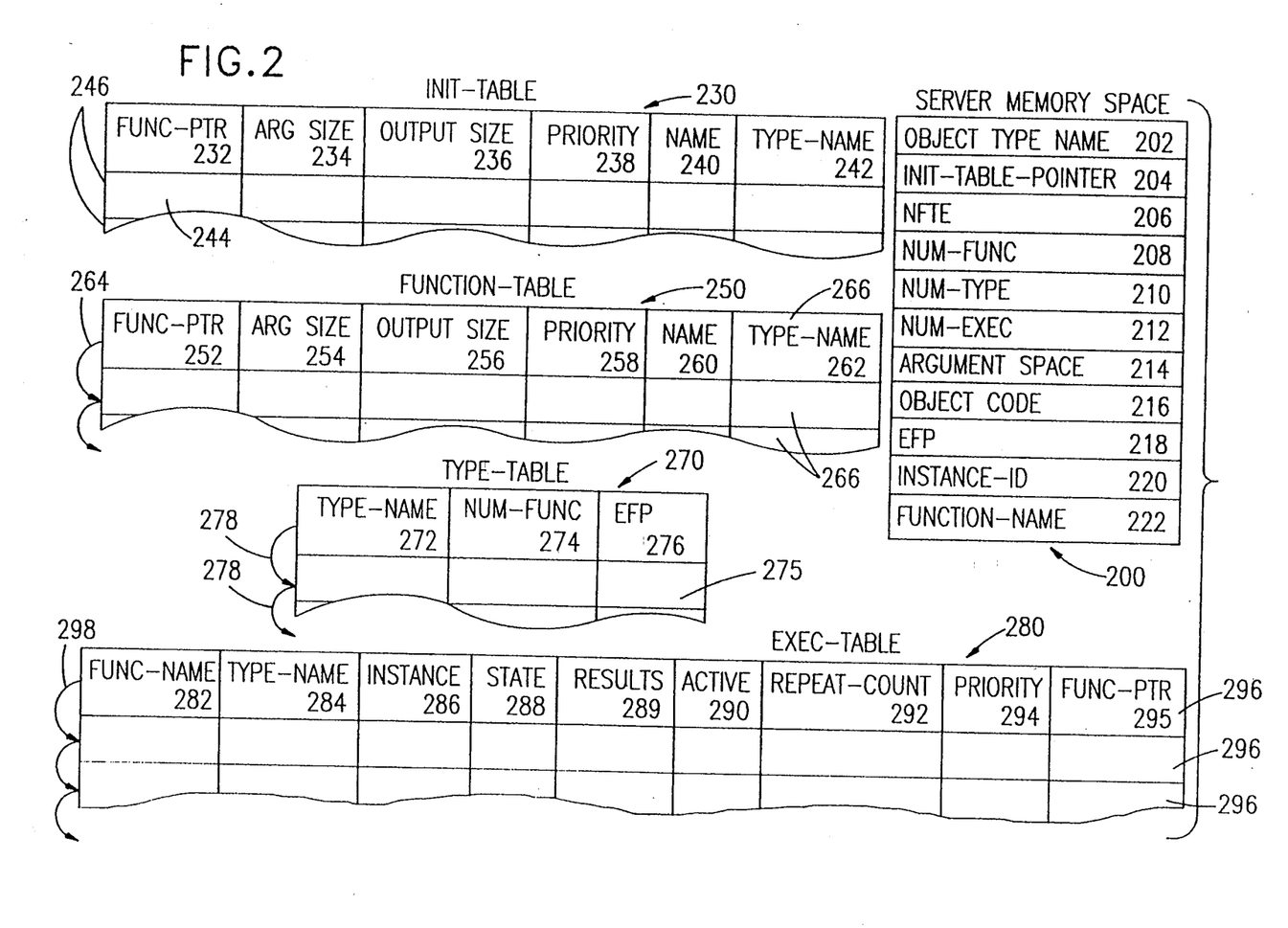
FIG. 2 shows the structure of the server memory space and the tables which the server uses to register and execute objects.

FIG. 2 shows the memory structure of information and tables used in the present server to register and run functions. The structures shown are variables: in server memory space 200, the Init_Table 230, the Function_Table 250, the Type_Table 270, and the Exec_Table 280. The Function_Table 250, Type_Table 270, and Exec_Tables 280 are tables that can grow and shrink in size. The preferred embodiment uses linked lists for these tables (designated by arrows 264, 278, and 298 respectively.)

The server has available memory variables 200 to store values and names associated with objects registered with the server. These variables include: the object type name or Type_Name 202, ITP 204, number of functions in Function_Table or NFTE 206 (length of function table), number of functions in a given object or Num_func 208, number of types or Num_type 210 (length of type table), and number of execution table entries or Num_exec 212 (length of execution table). There is also memory space in the server for arguments 214 used by the object's function(s) and the executable object code itself 216. An entry function pointer (EFP) 218, used to locate and run the entry function on the object and an Instance_ID 220 and function_name 222 are also variables included in the server memory space 200.

The Init_Table 230 is used to store information about an object when it is first transmitted to the server. This information is later placed in other tables. The entries 246 in the Init_Table 230 have 6 fields: Func_ptr 232, Argsize 234, Output Size 236, Priority 238, Name 240, and Type_Name 242. Func_ptr 232 points to the address of the function of the entry and is used to directly run the function. Argsize 234 is used to allocate enough space for the arguments to the function. Output Size 236 is used to allocate enough space for the results of the function. If there is no output associated with the function, the output size field 236 has a zero value and no space needs to be allocated. Priority 238 is used to determine the priority of the function in a list of functions to be executed. Name 240 is used to symbolically reference the function. Type_Name 242 is used to associate the function with a particular object type.

The function table 250 also has six fields for each of its entries 266: func_ptr 252, argsize 254, output size 256, priority 258, name 260, and type_name 262. These fields store the same information that their counterparts in the init_table 230 do and are identical to the fields in the init_table 230 in both function and format.

The type_table 270 has three fields in each of its entries 275: type_name 272 (identical to the type_name 242 in the init_table 230), num_func 274, and entry_function_pointer or EFP 276. The type_name 272 is the name of the object type. The num_func 274 is the number of functions which will be registered for this object. The EFP 276 is the pointer to the starting location of entry function which resides in the object. The type_table 270 has one entry for each type of object that is registered with the server.

The exec_table 280 has one entry 296 for each function which may be executed by the server. It has nine fields: the func_name 282, type_name (described above) 284, instance 286, state 288, results 289, active 290, repeat_count 292, priority 294, and func_ptr 295.

The func_name 282 is the name of the function in a given object. An object, i.e., object type, can have a plurality of functions. Note that the name of the function also appears in the name field 260 of the function_table 250.

The instance 286 is a way of keeping track of identical object types which have the same functions. For example, if more than one client has the same object type, the instance field keeps track of each client which tries to load the same object type with the server. The client registering the function is recorded in the instance field 286 by naming or numbering the client or by using any number of known ways practiced in the art. Therefore, the exec_table 280 has one function entry for each function that is registered by every client. A representation of the client registering each function is recorded in the instance field 286.

The state field 288 contains a pointer to memory space allocated by the server for storing the arguments of a given function.

The results field 289 stores the results of running the object. The size of this field depends on the space allocated for results in the output size field 256.

The active field 290 contains a flag which indicates whether or not the function is activated.

The repeat_count field 292 contains a count value which is decremented each time the function is run. It is used to determine the number of sequential times the function is run. The function is run one time for each time the server loops while the count value in the repeat_count 292 field has not decremented to a given value, e.g. 0. Other counting methods common in the art are also contemplated.

The priority field 294 is defined above and is the same value as in field 258 of the function_table 250. The func_ptr field 295 (described above) is the same value as in field 252 of the function_table 250.

Figure 3:
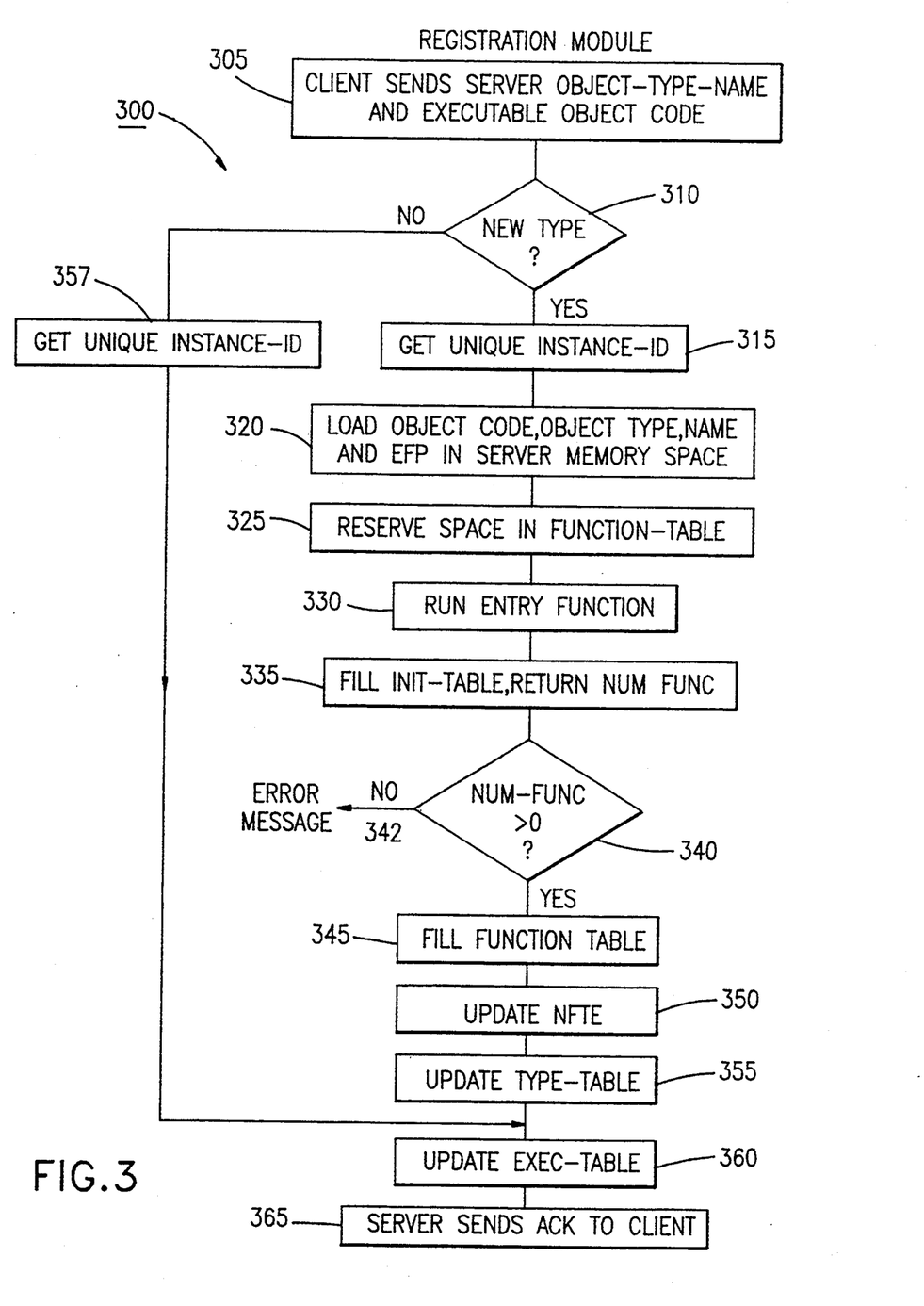
FIG. 3 is a flow chart showing the steps performed when registering an object and its functions with the present server.

FIG. 3 shows a flowchart of the steps 300 involve when a client registers an object.

In box 305 the client sends the server an object type name. (See FIG. 2.) The client also sends the server the executable object code. In another preferred embodiment, the client sends the object type name 202 and the filename where the object resides. The server then accesses and loads the object from this file location.

In box 310, the server checks to see if the object type that the client seeks to register is the same as any previously registered client. The server does this by scanning the type table 270 and comparing entries in the type_name field 272 to the incoming object's type name. If no similar object types exist in the type_table 270, the server gets a unique instance_id (box 315) and then loads the object (box 320). However, if there is a match, the server gets a unique instance_id 357, goes to the exec_table 280 and updates it (box 360).

In box 320, the server loads the object code into the server memory 216. The server, when loading the code, also obtains the entry_function_pointer value (EFP) from the object and stores the EFP in memory location 218. The server does this by calling an operating system function which is able to extract the EFP from the object. This is a standard operating system function in AIX, which is the preferred operating system on which the present invention runs. Note that in a normal program execution in AIX, the object is run immediately after the operating system determines the location of the EFP. However, this invention accesses the EFP and stores it for later use, i.e., the object may not be immediately executed. Any operating system which can gain access to an EFP type variable from the object is within the contemplation of the invention.

In box 320, the server also obtains the object type name, i.e. type_name, from the client. In the preferred embodiment, the client provides this information to the server at the same time as it provides the object code to the server (box 305).

In box 325, the server allocates space for an init_table 230 in the server memory. The server also defines the starting location of the of the init_table 230 with the init_table_pointer (ITP) 204. In the preferred embodiment, the init_table 230 is allocated space for a given number of functions. This number is greater than the number of functions that any object would have, i.e., 100 entries 246. Once the space is allocated, the server passes the ITP (the location of this space) to the entry function where the ITP is stored in the entry function argument. Using the EFP, the server runs the entry function which in turn fills the init_table 230, box 330. Alternatively, the server passes an undefined ITP to the entry function and then the entry function itself allocates as much space as it needs in the init_table 230.

Box 330 runs the entry function. The server uses the EFP 218 to access and execute the entry function. The entry function uses the ITP to find the starting entry location 244 of the init_table 230.

In box 335, the entry function begins filling the init_table 230 entries with information relating to its associated object. The entry function adds one entry to the init_table 230 for each function in the object that is to be registered. Therefore, the init_table 230 will have as many entries 246 as there are registered functions (used by the object). The entry function obtains information from the object to fill each field of the init_table for each entry 246. The entry function returns the number of entries filled in the table and that result is assigned to the value num_func 208, i.e., the number of functions in that object type.

The server then proceeds to decision block 340 where it checks how many functions were registered for the object. If there were no functions registered, an error acknowledgement is sent 342 to the client. However, if at least one function was registered, the server updates the function_table 250, type_table 270, and exec_table 280. See boxes 345, 355, and 360.

In box 345, the server updates the function_table. For each entry in the Init_Table 230, an identical entry is created in the Function_Table 250. In box 350, the value num_func 208 (the number of functions in this object or object type) is added to current value of NFTE 206 to update NFTE 206. NFTE is the total number of functions in the function table, i.e., the function_table 250 length.

In box 355, the server updates the type_table 270 by adding a single entry 275 corresponding to the object type (or object) being registered. The server fills all the fields of the type_table 270 for the new entry 275. The type_name 272 is set equal to the object_type_name 202. The num_func 274 is set to num_func 208. EFP 276 is set to EFP 218. Num_types 210, the memory variable representing the type_table 270 length, is incremented by one.

Boxes 319 and 357 perform identical functions, i.e, they provide a unique instance_ID value. In the preferred embodiment, the instance number for a client's object is the file descriptor on which communication is carried. Other methods are possible such as using a counter or using a unique name generator as commonly done. (Name generation can be done using either concatenation of known strings, e.g. type="Hand"=>instance="Hand 1", or by generating a known unique name, e.g. "XF$1s9P.187".)

In box 360, the server updates the exec_table 280. The server makes an entry 296 for each function of an object type being registered for each type_name 202, i.e. the client's instance, of that function. Therefore, there is an entry in the exec_table 280 for each function in every object instance that every client registers.

For each such function, the server creates an entry 296 in the exec_table 280 by filling in the exec_table 280 entry fields. The func_282 is set to name 260. The type_name 284 is set equal to the object type_name 202. The instance 286 is set to the instance_ID 220. The state field 288 is set to a block of memory of size argsize 254 allocated by the server. The active field 290 is set to false. The repeat count field 292 is set to zero. The priority field 294 is set to the function's priority 258. The func_ptr field 295 is set equal to func_ptr 252.

The server inserts the entry in the exec_table 280 such that it is before entries 296 of lower priority (i.e. higher value of priority field 294) and after entries 296 of higher priority.

The Num_Func 274 field of the matching type entry is added to Num_Exec_Entries 220, i.e., the Num_Exec_Entries is updated to reflect the current number of entries in the Exec_Table.

Having explained FIG. 3 and how to REGISTER an object, the features of the present invention can be used to perform various other activities including: UNREGISTERING an object, ACTIVATING and DEACTIVATING a function, CALLING a function, SETTING FUNCTION DATA, GETTING FUNCTION DATA and SETTING PRIORITY.

The UNREGISTER request removes a given instance of an object (and all its functions) from the server, i.e., it cause the server to "forget" the object. The UNREGISTERED object, with a given instance_ID (and its associated functions) is removed from the server. To do this, the server uses the type_name 202 and instance_ID 220 passed from the client (and stored in server memory locations 202 and 220 respectively) to scan the exec_table 280 and remove any entries 296 matching the given type name 202 and instance_ID 220. In the preferred embodiment, the server then scans the exec_table 280 a second time looking for the same given type_name 202 of any other instance_ID 220. If at least one such entry is found, then no further action is taken. If no such entries are found, then the type_table 270 and function_table 250 are updated. This update involves: finding and removing the single entry in the Type_Table 270 which has a Type_Name 272 matching the given type_name 202, decrementing Num_Types 218 by one, finding and removing each entry in the Function_Table 250 which has a Type_Name 262 matching the given type_name. In this way, space allocated for an object_type which has no clients registered to used it, can be reallocated.

The client uses the ACTIVATE request to change or enter an activate status of a function registered in the server. The client identifies the function to be activated by sending the server the function name, type_name, and instance. The server matches these values to the func_282, type_name 284, and instance 286 fields in the exec_table 280. The repeat_count 292 of the matching function is then set to a value that the server provides. The active flag 290 of the matching function (entry 296)is also set TRUE.

A client sends a DEACTIVATE request to the server when the client wants to deactivate a function. The client identifies the function to be deactivated by function name, type_name, and instance. The present server uses these values to match entries in the exec_table 280 using the fields func_name 282, type_name 284, and instance 286, respectively. If a match occurs, the server sets the active flag field 290 of the entry 298 to false.

A client uses a CALL request to run (execute) a function. The client identifies the function to the server by name, type_name, and instance_id (stored in server memory locations 222, 202 and 220 respectively.) The server matches these values against entries 296 in the exec_table 280 using the fields func_name 282, type_name 284, and instance 286, respectively. If a match is found, the server uses the func_ptr 295 to execute the function. The function is passed the value in the state field 288 which points to the pre-allocated space where the arguments to the function reside. The function returns a value. The server checks the value. If it is greater than zero, the contents of the memory space to which the results field 289 are sent to the client.

The client uses a SET FUNCTION DATA request to supply the server with arguments to a function. The client identifies the function by its name, type_name, and instance. These values are stored in the server memory 200 space locations 222, 202, and 220. The present server matches these values to entries 296 in the exec_table 280 using the fields func_name 282, type_name 284, and instance 286, respectively. If the server finds a match, the server copies the arguments supplied by the client into a memory space set aside for the arguments of the function. This memory space is located using the value in the state field 288 of the matched entry. The server copies the new arguments into this server memory space.

The client uses a GET FUNCTION DATA request to obtain the results of a function from a server. The client identifies the function by sending the server the function name, type_name, and instance. These values are matched to the func_name 282, type_name 284, and instance 286 fields in the exec_table 280. The matching entry 296 results field 289 points to a block of memory set aside for the results of the function. The server sends the contents of that block of memory to the client.

The client uses a SET PRIORITY request to change or enter a run priority of a function. The client identifies the function by sending the server the function name and type. The server matches these values to the func_name 282 and type_name 284 fields, respectively, in the exec_table 280. The matching entry priority field 294 is then set to a priority that the client provides.

Figure 4:
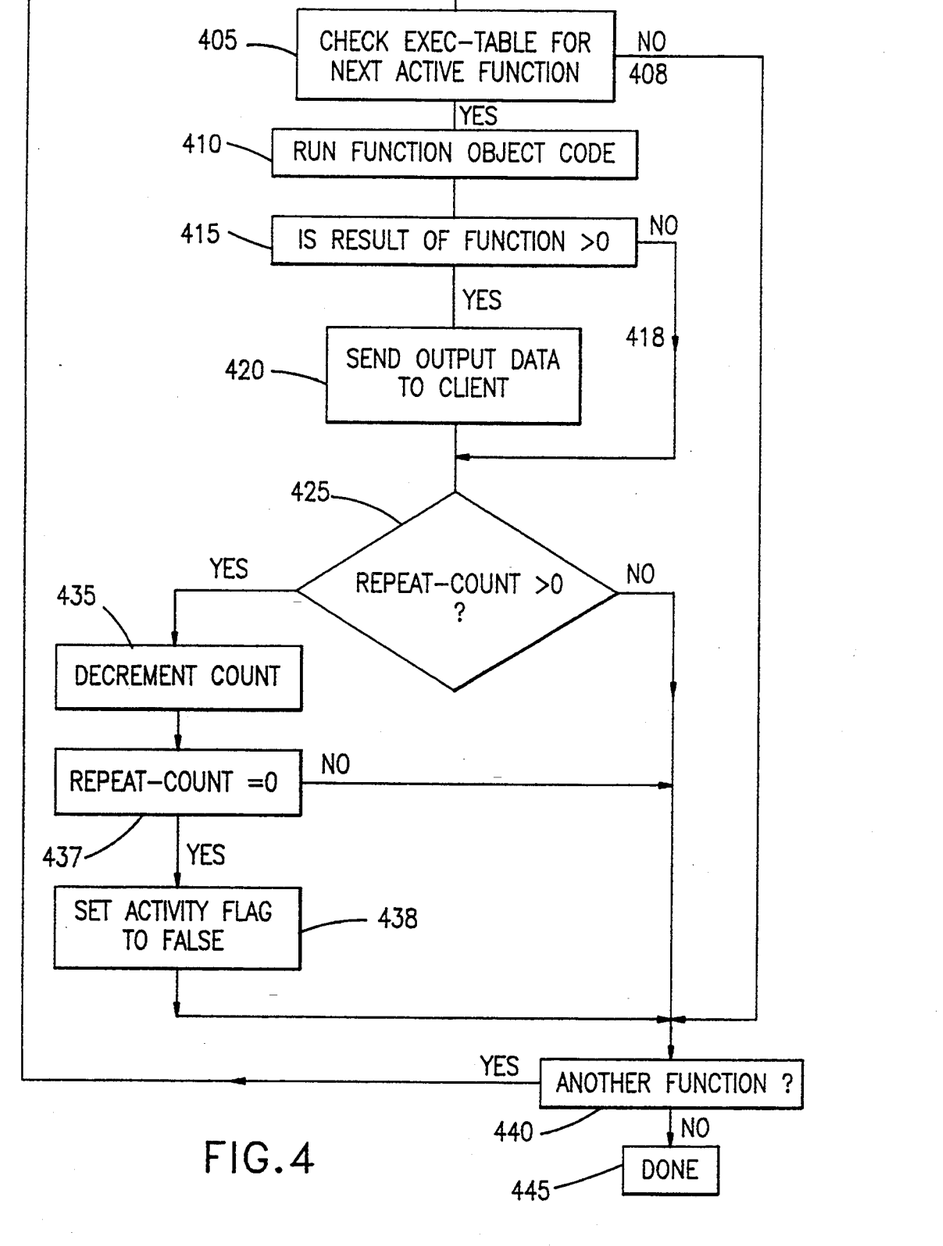
FIG. 4 is a flow chart showing the steps performed when executing an object and its functions using the present server.

FIG. 4 is a flow chart of the execution module of the present invention, i.e., the activity represented in box 30 of FIG. 1.

In box 405, the server checks an entry 296 in the exec_table 280 to determine if the function in the entry 296 is activated. The server does this by checking the active field 290 of the exec_table 280. If the function being checked is not active 408, the server checks the next function (the NO 408 branch to box 440). However, if the function being checked is active, the server runs the function (box 410).

Note that the server traverses the exec_table from top to bottom as it repeats the steps shown in FIG. 4. In the preferred embodiment, the exec_table 280 is arranged in priority order from top to bottom, i.e., the function entries 296 with higher priority are in a higher position in the table than the entries 296 of lower priority. (A lower number in the priority field 294 means a higher priority for the entry 296.) In an alternate embodiment, the priority of all the functions in the exec_table 280 could be equal or inconsequential. In these cases, the priority of each function can be set to a given default value or the priority field 294 could be removed entirely.

If the activity field 290 for an entry 296 in the exec_table 280 is activated (in one preferred embodiment it is set to TRUE), the function is run in box 410. In an alternative preferred embodiment, only the active functions are listed in the exec_table 280, i.e., those which the server is scheduled to execute. To run the function in the entry 296, the server uses the value of the func_ptr 295 to execute the identified function. The values in the state 288 and results 289 fields in the exec_table 280 are used as arguments when executing the function. The state 288 value is a pointer to a memory space in the server which contains the arguments which the function may need to run. The results 289 value is a pointer to a server memory space where the results of running the function will be stored.

In box 415, the function, having finished running, returns a value back to the server. In the preferred embodiment, if this returned value is greater than 0, the results of running the function, which are stored in the memory space pointed to by the results 289 value, are sent back to the client. See box 420. However, if the function returns a value of zero, the results stored in the memory space pointed to by the results 289 value, are not sent to the client. The results remain in the server memory and the server proceeds to box 425. See the NO branch 418 of box 415.

In box 425, the value of the repeat_count 292 field are checked. In the preferred embodiment, if the value is greater than 0, the value is decremented by 1. See box 435. However, if the value of the repeat_count 292 field is 0, the server goes to box 440.

In box 437, the repeat_count is checked after being decremented in box 435. If the repeat_count is not yet 0, box 440 (check For the next function) is run. If the repeat_count is 0, box 438 is run.

In box 438, the active flag 290 is set :false. (Note that an activated entry with an initial Repeat_Count of zero, will not be deactivated, therefore, will be run for each cycle of the server's main loop, until explicitly deactivated by a client.) After setting the active flag 290 to false, the server goes to box 440.

In box 440, the server determines if there is another function in the exec_table 280. If there is, the server begins execution of the flow chart again starting at box 405 for the next function. If there are no more functions in the exec_table 280, the server continues to box 445. In box 445, the server has completed the execution of activated functions in the exec_table (box 30 in FIG. 1), i.e., box 445 in FIG. 4 corresponds to line 32 in FIG. 1.

EXAMPLE

A Graphics Server

In this example, a server of the present invention is used to control a graphical display. There are two clients, client 1 and client 2, that are using the server. Each client wants to draw an image on the graphical display and move its image around the screen. The image each client will draw is a hand. The hand can be either a right or left hand.

The objects that the server uses to draw and move the hands are not preprogrammed into the server. They are provided by the clients in an executable form The objects and their associated functions are loaded into the server as described above. The objects are:

```
Object 1: type = "Graphics"
    functions:
    0:  Name      = "MakeWindow"
        Argsize   = 0
        Type Name = "Graphics"
        Priority  = 1
        Output size = 0
    1:  Name      = "ClearWindow"
        Argsize   = 0
        Type Name = "Graphics"
        Priority  = 2
        Output size = 0
    2:  Name      = "TransferToScreen"
        Argsize   = 0
        Type Name = "Graphics"
        Priority  = 999
        Output size = 0
Object 2: type = "Hand"
    functions:
    0:  Name      = "MakeHand"
        Argsize   = 0
        Type Name = "Hand"
        Priority  = 30
        Output size = 0
    1:  Name      = "DrawHand"
        Argsize   = 13 (bytes)
        Type Name = "Hand"
        Priority  = 40
        Output size = 0
```

Object 1 is a type called "Graphics." It has three functions: "MakeWindow", "ClearWindow", and "TransferToScreen". Each of these functions have the type_name 262 "Graphics" (the object type), have no arguments (argsize=0), and produce no output data (output size 256 in the function_table 250 is 0). The functions create a graphics window, clear the graphics window, and copy graphics data to the display, respectively. The priorities of the functions (priority field 294 in exec_table 280) are assigned so that function MakeWindow (priority 1), is above (runs first), function ClearWindow (priority 2), which is above the function TransferToScreen (priority 999).

Object 2 is a type called "Hand". It has two functions: "MakeHand" and "DrawHand". Both of these functions have a type_name called "Hand" and produce no output data (output size 256=0). The function "MakeHand" has no arguments (argsize=0) but the function "DrawHand" has a 13 byte argument. The first byte designates whether the hand is left/right, the next 4 bytes provide the hand x coordinate of position on the screen, the next 4 bytes the y coordinate, and the last 4 bytes the z coordinate. The "MakeHand" function creates the data set to describe a hand image and the "DrawHand" function displays the hand on the screen at the proper (x,y,z) location. The function "MakeHand" has a priority of 30 and the function "DrawHand" has a priority of 40.

Figure 5:
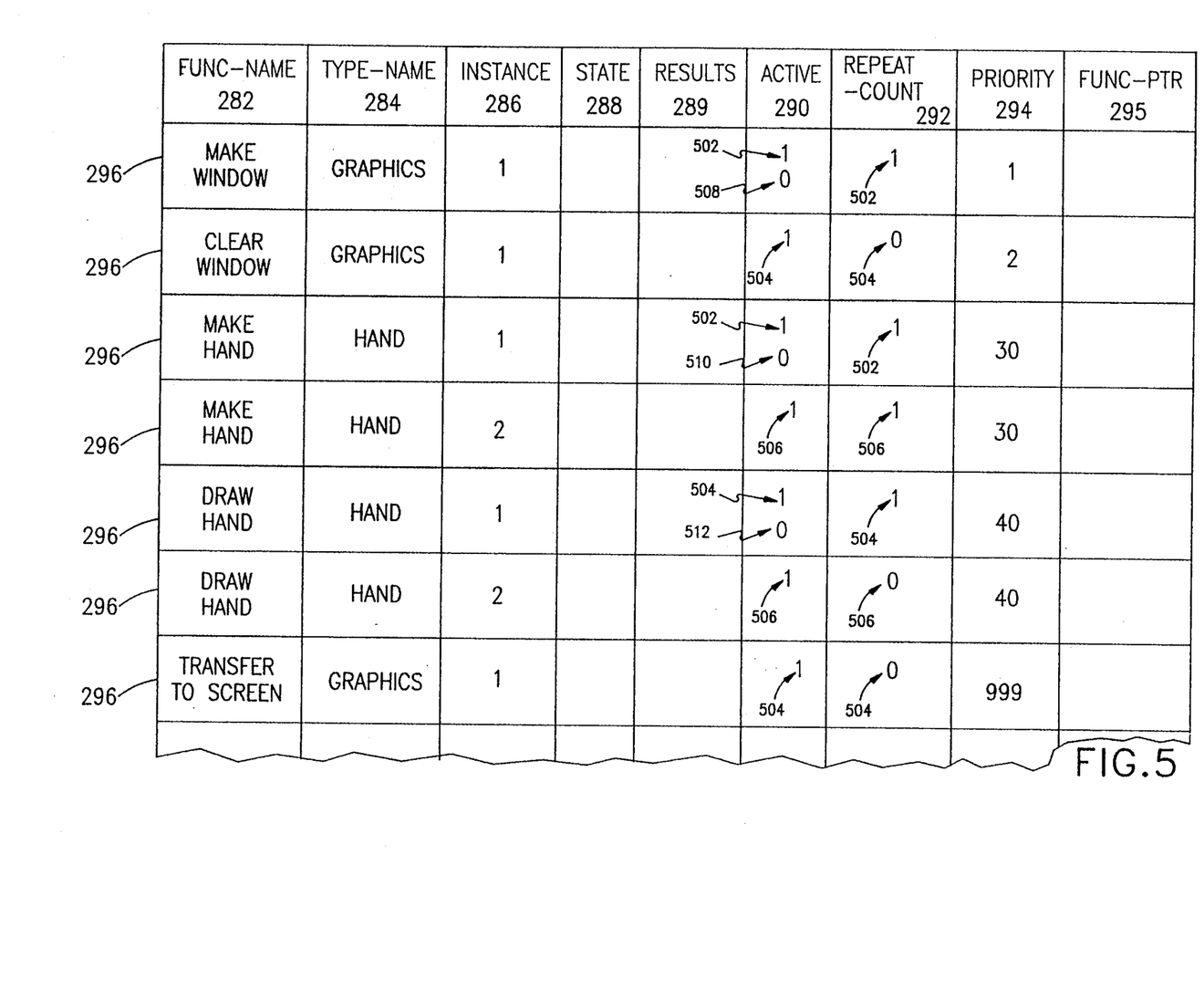
FIG. 5 shows a data structure of the present invention being used as a graphic display server that draws two hand images on a display screen.

The clients register these objects with the server in the manner described above. In this example, client 1 registers object 1 with the server. The server then loads in the code for object 1 and updates its tables. Client 1 then registers object 2 with the server. The server loads in the code for object 2 and updates its tables again. Client 2 then registers object 2 with the server. Since a new object type is not being introduced, the server does not need to load the code for object 2 (and its functions) again. However, the server updates the exec_table to reflect the addition of a second instance of object 2. FIG. 5 shows the exec_table of this example. Note that the Functions are listed from top to bottom in order of priority.

Once the clients have registered their objects (and the associated functions), the clients make requests of the server as described above. Client 1 ACTIVATES the MakeWindow instance 1 (client 1) and MakeHand instance 1 and uses the FUNCTION SET DATA request to set 502 their respective repeat_counts to 1. Similarly, the ClearWindow instance 1, TransferToScreen instance 1, and DrawHand instance 1 functions are ACTIVATED and their respective repeat_count fields 292 are set 504 to 0. Client 2 requests ACTIVATE the functions MakeHand instance 2 and DrawHand instance 2 and sets 506 their respective repeat_count fields to 1 and 0. Using the FUNCTION SET DATA request, client 1 and client 2 set the function data for DrawHand instance 1 and 2 respectively. Instance 1 has data for a left hand at a given (x,y,z) position and instance 2 has data for a right hand at a given (x,y, z) position. Note that functions with repeat_counts set to 1 only run on the first pass through the server loop and functions with repeat_counts set to 0 run every server loop. (See explanation of box 438 above.) As the server loops, it executes activated functions (box 30 in FIG. 1). The server encounters the activated functions in the function table as they are listed, in order of priority. The MakeWindow function is executed first and a window is created. The MakeWindow function is then deactivated 508 since its Repeat_Count was 1. The ClearWindow function is executed next and the window is cleared. The MakeHand instance 1 function is executed and the data structures for a hand are created. The MakeHand instance 1 function is then deactivated 510 since its Repeat_Count was 1. The MakeHand instance 2 function is executed and the data structures for a second hand are created. The MakeHand instance 2 function is then deactivated 512 since its Repeat_Count was 1. The DrawHand instance 1 functions is executed and the first hand is drawn to the graphics buffer. The DrawHand instance 2 function is executed and the second hand is drawn to the graphics buffer. The TransferToScreen is executed and the graphics are displayed.

If we now look at the exec_table in FIG. 5, only the activated function entries 296 are run in subsequent server loops. These functions are: ClearWindow, DrawHand instance 1 (left hand), DrawHand instance 2

(right hand), and TransferToScreen. Therefore, each server loop the window is cleared, each hand is drawn, and then transferred to the screen. (The deactivated functions, MakeWindow, MakeHand instance 1, and MakeHand instance 2 do not need to be repeated for each server loop to create these images.) The result is the image of a left hand (controlled by client 1) and a right hand (controlled by client 2) on the graphics screen in their respective (x,y,z) position.

Note that the image/position of either hand can be changed by the client controlling the hand using the FUNCTION SET DATA request to change the 13 byte argument date in the argsize field. In server loops subsequent to this request, the affected hand image will move to the new position on the screen (or change from right to left or visa versa). By changing these arguments continually, the hands can be made to move to different positions on the graphics screen.

This example can be expanded for three or more clients by using the same technique as described above. Alternatively, one (or more) clients can place their image on more than one server. The client can register the same or different objects with each server and then execute its object on the various servers.

EXAMPLE 2

Multiuser Computer Aid to Design

Using the present invention, one skilled in the art could envision multiple clients registering different graphical design objects on a server controlling a graphical display. As described in example 1, each client would have control of certain images on the screen. For instance, in the design of an automobile, one client can design the suspension, another design the car body, another the interior, etc. Each designer can receive a graphical output driven by the server in a remote location from the designers. Each designer can design his portion of the car while the other designers are designing theirs. The effects of each of the designers on the final design can be viewed on the graphical output as the design changes and the server updates the screen after each server loop. New clients can be added to the design process by registering their objects with the server. Old clients can easily be removed by unregistering their objects.

In another graphical design example, multiple clients may be served by multiple servers. There are k sites. Each site, i, has a client and a server, Ci and Si, and a user Ui. Each client, Ci, registers its graphical object with all servers Sj for j={0 to k}. Each user, Ui, interacts with the graphical scene on his display using his client Ci, which communicates to all servers including Si. The result is that multiple users interact only with their own graphical objects, while affecting a common scene.

Given the disclosure of this invention, one skilled in the art can develop many other alternative embodiments which are also within the contemplation of the invention. Some examples follow.

A client may choose to register an object with a set of protections or permissions. Protections or permissions allow or disallow certain clients from making certain requests. For example, a client might register an object with three functions and restrict the execution of two of those functions such that only the client itself can make requests for the execution of those two functions.

A protection scheme requires two parts 1) means of defining the protections and 2) means of enforcing the protections. Part number 1 can be implemented with a field in the function_table entry (also the init_table entry) where the field indicates which clients can execute the particular function associated with that entry. The indication can be as simple as a client name or a list of client names. Further, the protection field is unmodifyable by any client other than the one which registered the functions. Part number 2 can be implemented by associating with each client an encrypted identifier, which the client uses for all transactions with the server. The server then, based on the client's identification and the permissions associated with a function, authorizes or denies the clients requests.

It follows from the disclosure, that a client can register functions with a server and then make requests to call those functions in any order it sees fit. A client can get the results of the called functions in the same manner.

A client can construct a "program" as a sequence of requests to accomplish some task. For example:

```
Program
    Begin
        Register A ;register an object, A, with three functions a-c
        Call A/a ;call function a of object A
        Call A/b ;call function b of object A
        i = 0;
        While (i < 10)
            Begin
                i = i + 1;
                Call A/c ;call function c of object A
            End
    End
```

In addition to or in place of the execution module (FIG. 4), an interpretive execution module can be envisioned wherein the execution module would read program statements from a file or an object sent from a client, and in sequence execute associated requests. For example: Program

```
Begin
    Call A/a
    Call A/b
    i = 0;
    While (i < 10)
        Begin
            i = i + 1;
            Call A/c ;call function c of object A
        End
End
``` can be interpreted by the server causing the execution in sequence of function a of previously registered object A, then function b, and then function c ten times.

The server can be designed and coded with a user interface. The user interface can be built using X-windows or other commonly practiced methods. The user interface may be graphical and include buttons, menus, lists and so forth. The buttons and menus can give an operator of the server control and monitoring powers. Using the graphical interface, an operator can: view the contents of the server's tables (e.g. list of functions currently loaded in the server); load an object into the server for use by clients; unload an object from the server; and monitor the usage of the server.

Essentially, the user interface modifies FIG. 1 such that in addition to checking for and handling requests from external clients, the server code will check for and handle requests from a user through the user interface. An event based user interface such as X-Windows is preferred. The user generates requests using the graphical user interface and mouse. The user gets feedback and monitors the state of the server through lists. A graphical map can show the connections to the server from various clients.

We claim:

1. A method of executing a modifiable function on a server comprising the steps of:
   a. loading an executable code object into the server by a client program during execution of a server program;
   b. registering one or more functions contained in the object into the server using registration information provided by the object, the registration information including a function pointer for determining a location of the function; and
   c. executing the function, by the server, using the function pointer to locate the executed function.

2. A method of executing a modifiable function on a server, as in claim 1, where the registration information is stored in tables in server memory and the registration information can be modified by one or more requests.

3. A method of executing a modifiable function on a server, as in claim 2, where the registration information designates activity status of each of a plurality of functions and executes only active functions in a given loop of the server program.

4. A method of executing a modifiable function on a server, as in claim 3, where the registration information includes the priority of each of a plurality of functions and active functions are executed in a given loop of the server program in a priority order.

5. A method of executing a modifiable function on a server, as in claim 4, where the registration information includes a repeat_count value of each of a plurality of functions and the function is run in a number of server program loops as determined by the repeat count_value.

6. A method of executing a modifiable function on a server, as in claim 2, where a client request can UNREGISTER an object by changing the registering information after which the functions of the unregistered object are no longer executed by the server.

7. A method of executing a modifiable function on a server, as in claim 2, where the client requests the server to ACTIVATE a function by changing the registration information after which the function will be executed in at least one server loop.

8. A method of executing a modifiable function on a server, as in claim 2, where the client requests the server to DEACTIVATE a function by changing the registration information after which the function will not be executed in a server loop.

9. A method of executing a modifiable function on a server, as in claim 2, where the client requests the server to CALL a function by changing the registration information after which the function is executed.

10. A method of executing a modifiable function on a server, as in claim 2, where the client requests the server to SET FUNCTION DATA after which the function has new data to use as an argument.

11. A method of executing a modifiable function on a server, as in claim 2, where the client requests the server to GET FUNCTION DATA after which the server returns the results of a previously executed function to the client.

12. A method of executing a modifiable function on a server, as in claim 2, where the client requests the server to SET PRIORITY after which the function is executed in a different sequence in the server loop.

13. A method of executing a modifiable function on a server, as in claim 1, where the server program characteristics are changed by a function on which runs in an infinite loop which does not return to the server when called.

14. A method of a client executing one or more modifiable functions on a server comprising the steps of:
   sending executable object code and an object_type name from the client to the server;
   loading the object code, object_type name and an entry function pointer into a first part of server memory;
   storing information about one or more functions in a second part of the reserved server memory by running an entry function;
   organizing information about each function in a priority order in a third part of server memory; and
   executing the functions in the order in which they are organized.

15. A method of a client executing one or more modifiable functions on a server, as in claim 14, where the client sends the server the object_type name and a file name which is the name of the file holding the object code.

16. A method of a client executing one or more modifiable functions on a server, as in claim 14, where the information includes a designation for client instance.

17. A method of a client executing one or more modifiable functions on a server, as in claim 14, where the functions are only executed if the function information indicates that the function is activated.

18. A method of a client executing one or more modifiable functions on a server, as in claim 14, where the second part of server memory is a function_table and the third part of server memory is an exec_table.

19. A method of a client executing one or more modifiable functions on a server, as in claim 18, where for each function the function_table has a field for a pointer means for calling a function and the exec_table has a field for activity status.

20. A method of a client executing one or more modifiable functions on a server, as in claim 14, where the functions are only executed if the function has an active status.

21. A method of a client executing one or more modifiable functions on a server, as in claim 14, where the order of execution can be changed by changing a priority of the function.

22. A method of a client executing one or more modifiable functions on a server, as in claim 14, where a function is prevented from executing by setting its active status to INACTIVE.

23. A method of a client executing one or more modifiable functions on a server, as in claim 14, where the function is executed in each loop of the server for a total number of executions determined by a repeat_count value in server memory.

24. A method of a client executing one or more modifiable functions on a server, as in claim 14, where the functions are used to generate and display graphical images.

25. A method of a plurality of clients executing one or more modifiable functions on a server, as in claim 24, where each client has control of part of a screen display.

26. A method of a client executing one or more modifiable functions on a server, as in claim 14, where the client can protect the executable object code it sends to the server from being run by other clients.

27. A method of a client executing one or more modifiable functions on a server, as in claim 14, where the client executes the functions in an order given by a program.

28. A method of a client executing one or more modifiable functions on a server, as in claim 27, where the program executing the functions is an object running on the server.

29. A method of a client executing one or more modifiable functions on a server, as in claim 14, where the server provides a graphical interface to a user.

30. A method of a client executing one or more modifiable functions on a server, as in claim 29, where the graphical interface is used to display information about functions stored in server memory.

31. A method of a client executing one or more modifiable functions on a server, as in claim 29, where the graphical interface is used to make requests of the server.

* * * * *